Patented July 15, 1952

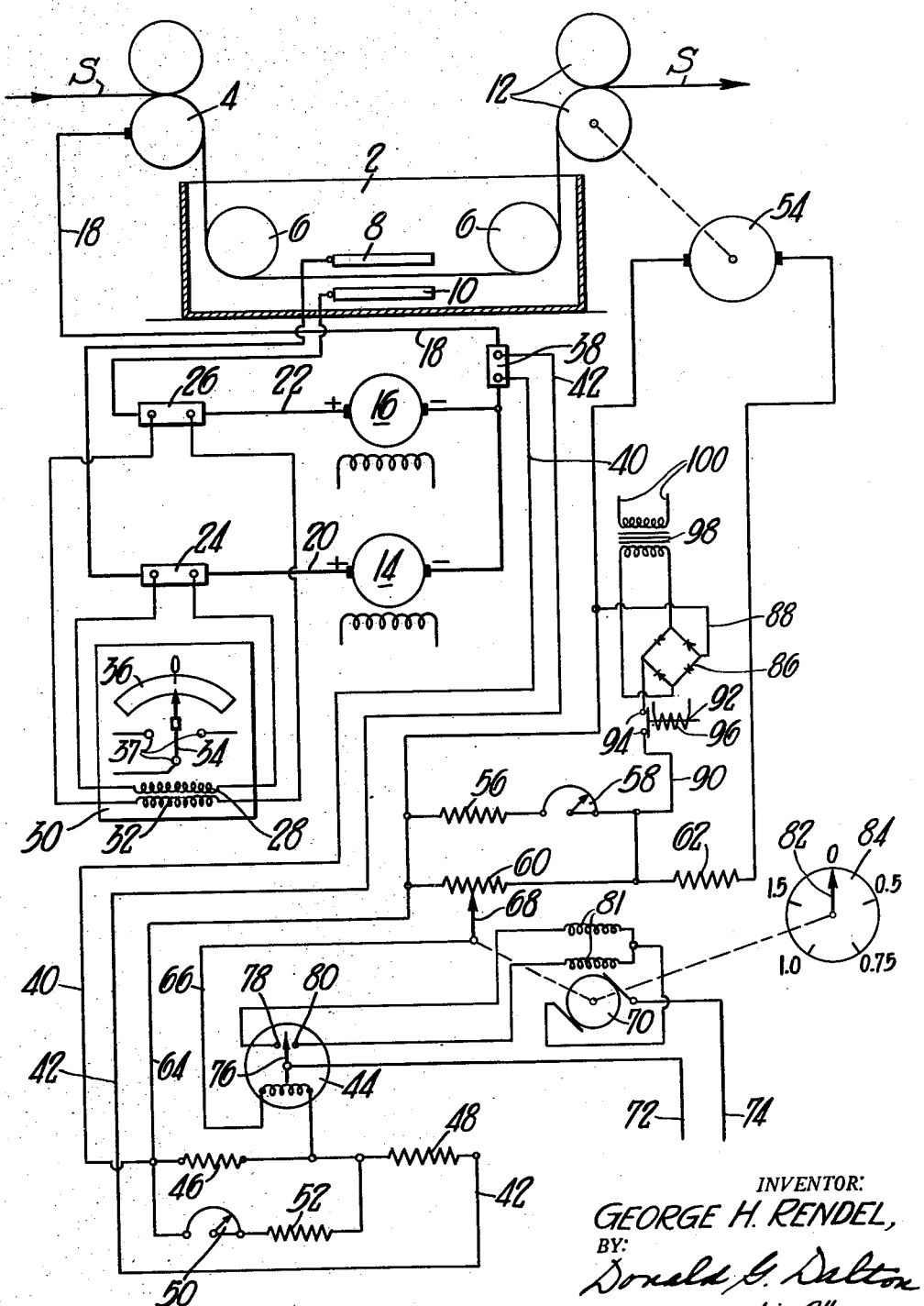

2,603,595

UNITED STATES PATENT OFFICE 2,603,595

PLATING THICKNESS METER

George H. Rendel, Mount Lebanon, Pa., assignor to United States Steel Company, a corporation of New Jersey Application June 8, 1948, Serial No. 31,772

8 Claims. (Cl. 204—195)

This invention relates to a plating thickness meter and more particularly to such a meter for determining the amount of tin or other metal electrolytically deposited on moving strip material. In electrolytic tinning lines marked economies and improvement in quality can be made if the quantity of tin being deposited on the strip is known at all times. At the present time, I do not know of any apparatus which can be used to determine this. It is also advantageous in some instances to determine the ratio or distribution of electroplating on each side of the strip. The quantity of tin electroplated on strip is normally expressed as pounds per base box and normally the specifications call from 0.1 pound to 1.5 pounds per base box. One base box represents a single surface area of 217.78 sq. ft., which is normally plated on both sides. It is well known that the quantity of tin electrodeposited on the strip is a function of the plating time, the density of the plating current, and the efficiency of the plating bath. Therefore, the quantity of tin coating deposited per base box when the plating efficiency is constant is a direct function of the plating current density and the plating time. Since the length of the plating pass is constant, the plating time is inversely proportional to the strip speed. In ordinary operations the strip width varies with different orders and therefore it is necessary to compensate for variations in strip width.

It is an object of my invention to provide a plating thickness meter which can continuously determine the amount of metal deposited on a moving article.

Another object is to provide apparatus for indicating the ratio of metal plated on each side of the strip.

These and other objects will be more apparent after referring to the following specification and attached drawing, in which the single figure is a schematic view of my invention.

Referring more particularly to the drawing the reference numeral 2 indicates a plating tank containing an electrolyte. The strip S to be coated passes over the conductor roll 4 into the tank 2 and is directed by means of deflector rolls 6 between anodes 8 and 10. The strip passes out of the tank between rolls 12. Plating current is provided to the anode 8 by means of a generator 14 and to anode 10 by means of an identical generator 16. The negative terminals of generators 14 and 16 are connected to the conductor roll 4 through their common lead 18 so that the strip S is maintained at cathode potential. The positive terminal of generator 14 is connected to the anode 8 through a lead 20 and the positive terminal of generator 16 is connected to the anode 10 through a lead 22. A shunt 24 in the line 20 and a shunt 26 in the line 22 measure the plating current for anodes 8 and 10, respectively. The voltage drop across shunt 24 is proportional in amplitude to the current passing through line 20. The leads from the shunt 24 are connected to the resistance element 28 of a ratio meter 30. The voltage drop across shunt 26 is proportional in amplitude to the current passing through line 22. The leads from the shunt 26 are connected to a second element 32 of the ratio meter 30. The elements 28 and 32 are opposed to each other and when the plating current being supplied to anodes 8 and 10 is equal the two elements of meter 30 are of equal strength so that no torque is developed in the meter. Thus the pointer 34 remains in 0 position as shown. If more current is supplied to one anode than to the other, the elements will be of different strength so that the pointer 34 will deflect from 0, thus indicating which side of the strip is receiving the highest plating current. The meter scale 36 may be calibrated in percent so that the position of the meter pointer will indicate the ratio of top and bottom plating currents, which in turn, indicates the ratio of the electroplated material on each side of the strip. The contacts 37 on ratio meter 30 may be used to provide visible or audible signals or to actuate auxiliary devices designed to automatically adjust the current being supplied to the plating anodes.

A shunt 38 is connected in series with the cathode lead 18. Therefore, all plating current passes through the shunt and a potential drop across the terminals thereof may be used as an indication of the total current being supplied to the plating bath. The leads 40 and 42 from the shunt 38 are connected to a contact making galvanometer or other polarity sensitive potential comparing device 44 through resistances 46 and 48. Connected in shunt across the terminals of resistance 46 is an adjustable potentiometer 50 and resistance 52. Mechanically connected to the roll 12 is a tachometer generator 54. Since the tachometer generator is driven at strip speed, it provides a source of potential having an amplitude directly proportional to the speed of the strip through the plating tank. Tachometer generator 54 is connected to a voltage dividing network comprised of resistor 56, variable potentiometer 58, variable potentiometer 60 and resistor 62. The resistor 56 and potentiometer 58 are connected across the terminals of potentiometer 60 and are used as a shunting means to provide adjustment to compensate for changes in strip width. The potential drop across potentiometer 60 is impressed on the galvanometer 44 through lines 64 and 66. The adjustable arm 68 of potentiometer 60 is mechanically connected to a split field reversible motor 70 which is provided with power through the lines 72 and 74. Line 72 is connected to the movable element 76 of the galvanometer 44. Two stationary contacts 78 and 80 are provided in the galvanometer and a circuit is completed to one of the fields of motor 70 depending upon which of the stationary contacts is contacted by the element 76. The direction of rotation of the motor 70 depends upon which of its fields 81 is energized. The motor 70 is also mechanically connected to the arm 82 of a dial 84 which is calibrated to read from 0 to 1.5. The movement of the arm 82 corresponds to the movement of the arm 68.

When the tinning line is not operating, the voltage outputs from tachometer generator 54 and shunt 38 are zero so that no energy is impressed on the winding of galvanometer 44. Therefore, the contacts of galvanometer 44 will remain open and the contact arms 68 and 82 will remain in their attained position instead of indicating zero. Thus, it cannot be determined by looking at the dial 84 that the line is not in operation. If a continuous record is being kept, it will indicate that the line is operating at all times. In order to remedy this, I provide a rectifier 86 having its rectified output applied across the resistor 60 through the lines 88 and 90. Located in the line 90 is a relay 92 having normally closed contacts 94 and a coil 96 which is energized when the line is operating. Alternating current is applied to rectifier 86 from the secondary winding of a transformer 98. The primary winding of the transformer 98 is energized from alternating current supply lines 100.

When the line is operating the coil 96 is energized, thus opening the contacts 94 so that no current is supplied through the lines 88 and 90 to resistor 60. When the line is at rest, the coil 96 is deenergized closing contacts 94 so that a direct current potential is applied across the resistor 60. This voltage energizes the winding of galvanometer 44, thus moving its pointer 76 in a direction to complete the circuit to the reverse winding of motor 70, which in turn, moves the contact arms 68 and 82 to the zero position. These arms are maintained in this position until the tinning line is started, when the normally closed contacts 94 are opened and the meter is restored to normal operation.

The operation of the device is as follows:

It may be assumed that a strip 30 inches wide is passing through a plating bath at a speed of 500 ft. per minute, while the plating generators 14 and 16 are supplying 35,000 amperes to the plating anodes with an estimated plating efficiency of 100% and it is desired to deposit 0.5 pound of tin per base box on the strip. Under these conditions, potentiometer 58, which is provided with a calibrated dial indicating the strip width, is adjusted so as to read 30 inches and the potentiometer 50, which is calibrated to indicate efficiency, is adjusted to 100% on its calibrated dial. It is further assumed that the output from generator 54 is 5 volts and the voltage drop across potentiometer 60 is 0.015 volt. The 35,000 ampere load on shunt 38 causes a voltage drop of 0.035 volt at its terminals, which in turn causes a voltage drop of 0.005 volt across resistor 46. Under the conditions described above, it will be evident that the measuring circuit will be balanced when the movable contact arm 68 is located at a distance one-third of its full travel on potentiometer 60 at which point the dial arm 82 will read 0.5 pound on the graduated scale.

In order to check the plating efficiency, a sample of the strip plated under the above conditions is obtained and the quantity of coating on the sample is determined by suitable means which is preferably a chemical method. If the sample tested reveals a coating of 0.475 pound per base box, the potentiometer 50 is rotated counterclockwise until it points to a position indicating 95% on its calibrated scale, thus decreasing the ohmic value of the shunting resistance around resistor 46 which causes the potential drop across resistor 46 to decrease. This decrease in potential unbalances the measuring circuit so that the movable arm 76 will contact contactor 80, thus causing the motor 70 to rotate and move the arm 68 to a position where the circuit is balanced. The arm 82 will then be pointing to the position of 0.475 on the graduated scale 84. Once the plating efficiency is determined, the operator may employ the apparatus to continuously indicate the coating weight on the strip as it is being processed. Since the efficiency of the plating current does not change abruptly, but occurs at a gradual rate over an extended period, the efficiency need only be checked in this manner from time to time. In order to obtain a coating weight of 0.5 pound per base box, the output of plating generators 14 and 16 must be increased until the arm 82 indicates 0.5 on the graduated scale 84.

For another example, assume that a 24 inch wide strip is being plated at 500 ft. per minute while the generators are supplying 29,500 amperes to the plating bath with an estimated plating efficiency of 95%. Under these conditions potentiometer 58 is adjusted to the 24 inch position on its dial and potentiometer 50 is adjusted to the 95% position on its dial. The electrical output from tachometer generator 54 will remain at 5 volts, but the potentiometer 58 now has less resistance so that it becomes a more effective shunt around potentiometer 60, thus lowering the voltage drop across potentiometer 60 to 0.012 volt. The voltage drop across shunt 38 is 0.0295 volt and with potentiometer 50 adjusted for 95% plating efficiency, the potential drop across resistor 46 becomes 0.004 volt. Therefore the measuring circuit will reach a balance when contact arm 68 is positioned one-third of the travel distance on potentiometer 60, this corresponding to 0.5 on the graduated scale 84. If it is desired to increase the tin deposit to 1 pound per base box, the plating current is increased to 59,000 amperes with no change in the setting of potentiometers 50 and 58. This does not change the potential drop across potentiometer 60 but the voltage drop across resistor 46 is doubled and becomes 0.008 volt. This increased potential unbalances the measuring circuit, causing contact arm 68 to move in the proper direction to restore balance. The measuring circuit will become balanced when contact arm 68 is positioned two-thirds of its travel distance, which position corresponds to 1 on the graduated dial 84. If desired, potentiometer 60 may be equipped with an appropriate contact making mechanism to operate an alarm or other device in the event the coating thickness deviates in excess of its specified limits.

Thus it is seen that I provide means for obtaining a potential proportional to plating current and means for obtaining a potential proportional to strip speed and then compare these two potentials so that when they are balanced they will indicate the amount of metal plated. This amount may be expressed in terms of coating thickness, pounds per base box or in any desired manner.

While one embodiment of my invention has been shown and described, it will be apparent that other adaptations and modifications may be made without departing from the scope of the following claims.

I claim:

1. Apparatus for determining the amount of metal electrolytically deposited on an elongated longitudinally moving article which comprises a first circuit for obtaining a potential proportional to plating current, a second circuit for obtaining a potential proportional to article speed, a polarity sensitive potential comparing device connected in both of said circuits for comparing the two potentials, a voltage divider in one of said circuits, a movable arm for said voltage divider, a series connection between said arm and the potential comparing device, and a reversible motor controlled by said comparing device connected to change the position of said arm to balance the potentials applied to the comparing device, the position of said arm indicating the plating thickness.

2. Apparatus for determining the amount of metal electrolytically deposited in an elongated longitudinally moving article according to claim 1 including means for varying the potential supplied to the comparing device from one of said circuits to compensate for the size of the article.

3. Apparatus for determining the amount of metal electrolytically deposited on an elongated longitudinally moving article which comprises means for obtaining a direct current potential proportional to plating current, a second means for obtaining a direct current potential proportional to article speed, a polarity sensitive voltage comparing device, an electrical connection between one side of the voltage comparing device and one pole of one of the potential obtaining means, an electrical connection between one pole of the other of said potential obtaining means and one side of the voltage comparing device, said last named pole being of the same polarity as the said pole of the other potential obtaining means, an electrical connection between the other poles of said potential obtaining means, means for varying the value of the potential supplied to the voltage comparing device from the second named means according to the size of the article, means for changing the voltage applied to the voltage comparing device from the second named potential obtaining means, and a reversible motor controlled by said voltage comparing device for controlling said last named means to change the voltage applied to the voltage comparing device from the second named potential obtaining means to balance the potentials applied to the comparing device.

4. Apparatus for determining the amount of metal electrolytically deposited on an elongated longitudinally moving article which comprises means for obtaining a direct current potential proportional to plating current, a second means for obtaining a direct current potential proportional to article speed, a polarity sensitive voltage comparing device, an electrical connection between one side of the voltage comparing device and one pole of one of the potential obtaining means, a voltage divider, an electrical connection between one pole of the other of said potential obtaining means and one side of the voltage divider, said last named pole being of the same polarity as the said pole of the other potential obtaining means, a common electrical connection between the other pole of each of the potential obtaining means and the other side of the voltage divider, a movable arm for said voltage divider, an electrical connection between said arm and the second side of the voltage comparing device, and a reversible motor controlled by said voltage comparing device for changing the position of said arm to balance the potentials applied to the voltage comparing device, the position of said arm indicating the plating thickness.

5. Apparatus for determining the amount of metal electrolytically deposited on an elongated longitudinally moving article which comprises a first circuit for obtaining a potential proportional to plating current, a second circuit for obtaining a potential proportional to article speed, a polarity sensitive potential comparing device connected in both of said circuits for comparing the two potentials, a voltage divider in one of said circuits, a movable arm for said voltage divider, a series connection between said arm and the potential comparing device, a reversible motor controlled by said comparing device connected to change the position of said arm to balance the potentials applied to the comparing device, a scale, and an indicator controlled by said motor and cooperating with said scale to indicate the amount of metal deposited.

6. Apparatus for determining the amount of metal electrolytically deposited on an elongated longitudinally moving article according to claim 5 including means in the second named circuit for applying a potential to the comparing device when the article stops moving.

7. Apparatus for determining the amount of metal electrolytically deposited on an elongated longitudinally moving article which comprises means for obtaining a direct current potential proportional to plating current, a second means for obtaining a direct current potential proportional to article speed, a polarity sensitive voltage comparing device, an electrical connection between one side of the voltage comparing device and one pole of one of the potential obtaining means, an electrical connection between one pole of the other of said potential obtaining means and one side of the voltage comparing device, said last named pole being of the same polarity as the said pole of the other potential obtaining means, an electrical connection between the other poles of said potential obtaining means, means for varying the value of the potential supplied to the voltage comparing device from the second named means according to the size of the article, means for changing the voltage applied to the voltage comparing device from the second named potential obtaining means, a reversible motor controlled by said voltage comparing device for controlling said last named means to change the voltage applied to the voltage comparing device from the second named potential obtaining means to balance the potentials applied to the comparing device, a scale, and an indicator controlled by said motor and cooperating with said scale to indicate the amount of metal deposited.

8. Apparatus for determining the amount of metal electrolytically deposited on an elongated longitudinally moving article which comprises means for obtaining a direct current potential proportional to plating current, a second means for obtaining a direct current potential proportional to article speed, a polarity sensitive voltage comparing device, an electrical connection between one side of the voltage comparing device and one pole of one of the potential obtaining means, a voltage divider, an electrical connection between one pole of the other of said potential obtaining means and one side of the voltage divider, said last named pole being of the same polarity as the said pole of the other potential obtaining means, a common electrical connection between the other pole of each of the potential obtaining means and the other side of the voltage divider, a movable arm for said voltage divider, an electrical connection between said arm and the second side of the voltage comparing device, a reversible motor controlled by said voltage comparing device for changing the position of said arm to balance the potentials applied to the voltage comparing device, a scale, and an indicator controlled by said motor and cooperating with said scale to indicate the amount of metal deposited.

GEORGE H. RENDEL.

REFERENCES CITED

The following references are of record in the file of this patent:

UNITED STATES PATENTS

| Number | Name | Date |
| --- | --- | --- |
| 1,396,919 | Brace | Nov. 15, 1921 |
| 2,325,401 | Hurlston | July 27, 1943 |
| 2,427,661 | Cook | Sept. 23, 1947 |
| 2,473,918 | Stoltz et al. | June 21, 1949 |